United States Patent
Kalwitz et al.

(10) Patent No.: US 9,760,293 B2
(45) Date of Patent: Sep. 12, 2017

(54) MIRRORED DATA STORAGE WITH IMPROVED DATA RELIABILITY

(71) Applicants: George Alexander Kalwitz, Mead, CO (US); Michael David Barrell, Superior, CO (US); Zachary David Traut, Denver, CO (US); Thomas George Wicklund, Longmont, CO (US)

(72) Inventors: George Alexander Kalwitz, Mead, CO (US); Michael David Barrell, Superior, CO (US); Zachary David Traut, Denver, CO (US); Thomas George Wicklund, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 406 days.

(21) Appl. No.: 13/952,722

(22) Filed: Jul. 29, 2013

(65) Prior Publication Data
US 2014/0258612 A1    Sep. 11, 2014

Related U.S. Application Data

(60) Provisional application No. 61/774,177, filed on Mar. 7, 2013.

(51) Int. Cl.
G06F 11/20    (2006.01)
G06F 3/06    (2006.01)
G06F 12/0868    (2016.01)

(52) U.S. Cl.
CPC ............ *G06F 3/0619* (2013.01); *G06F 3/065* (2013.01); *G06F 3/0689* (2013.01);
(Continued)

(58) Field of Classification Search
CPC ...... G06F 3/065; G06F 3/0689; G06F 3/0619; G06F 12/0868
See application file for complete search history.

(56) References Cited

U.S. PATENT DOCUMENTS 5,758,187 A    5/1998 Young
5,953,352 A    9/1999 Meyer
(Continued)

OTHER PUBLICATIONS

Vaes, Karim. HP LeftHand P4X00: Network Raid Explained. Jan. 4, 2012 [retrieved on Sep. 23, 2015]. Retrieved from the Internet: <URL: https://kvaes.wordpress.com/2012/01/04/p4500-lefthand-p4x00-network-raid-explained/>.*
(Continued)

*Primary Examiner* — Gabriel Chu
*Assistant Examiner* — Paul Contino
(74) *Attorney, Agent, or Firm* — Thomas J. Lavan

(57) ABSTRACT

A plurality of arrays of storage devices, each providing dual storage device redundancy, is provided. The plurality of arrays of storage devices includes a plurality of mirrored sets of primary storage devices, each including an even number of at least two or more primary storage devices. Each of the mirrored sets of primary storage devices stores a first and a second copy of data. The plurality of arrays of storage devices also includes a secondary storage device, which is a single physical storage device that stores a third copy of the data stored on each of the plurality of mirrored sets of primary storage devices. The secondary storage device has at least the capacity to store the data stored on the plurality of mirrored sets of primary storage devices. Dual storage device redundancy preserves data if data cannot be read from one or two physical storage devices in any array.

18 Claims, 14 Drawing Sheets

(52) U.S. Cl.
CPC ...... *G06F 11/2053* (2013.01); *G06F 11/2058* (2013.01); *G06F 11/2074* (2013.01); *G06F 11/2087* (2013.01); *G06F 11/2094* (2013.01); *G06F 12/0868* (2013.01)

(56) References Cited

U.S. PATENT DOCUMENTS

| | | | | |
|---|---|---|---|---|
| 6,012,123 | A * | 1/2000 | Pecone | G06F 11/1076 711/111 |
| 6,332,177 | B1 | 12/2001 | Humlicek | |
| 6,434,720 | B1 | 8/2002 | Meyer | |
| 6,587,970 | B1 * | 7/2003 | Wang | G06F 11/2023 714/22 |
| 6,643,667 | B1 * | 11/2003 | Arai | G06F 3/061 707/640 |
| 6,701,385 | B1 | 3/2004 | Young | |
| 6,728,791 | B1 | 4/2004 | Young | |
| 6,988,166 | B1 | 1/2006 | Young | |
| 7,000,142 | B2 * | 2/2006 | McCombs | G06F 11/1417 714/6.12 |
| 7,062,673 | B2 | 6/2006 | Ng | |
| 7,080,198 | B1 | 7/2006 | Young | |
| 7,107,343 | B2 | 9/2006 | Rinaldis et al. | |
| 7,418,621 | B2 | 8/2008 | Ashmore | |
| 7,500,070 | B2 | 3/2009 | Schilling et al. | |
| 7,516,355 | B2 * | 4/2009 | Noya | G06F 11/1435 711/114 |
| 7,739,544 | B2 * | 6/2010 | Yamato | G06F 11/1092 714/6.32 |
| 8,103,825 | B2 | 1/2012 | McKean | |
| 8,281,069 | B2 | 10/2012 | Van der Goot et al. | |
| 8,307,159 | B2 | 11/2012 | McKean | |
| 8,930,647 | B1 * | 1/2015 | Smith | G06F 9/44557 711/103 |
| 9,003,114 | B2 * | 4/2015 | Young | G06F 12/0804 711/113 |
| 9,286,219 | B1 * | 3/2016 | Derbeko | G06F 12/0811 |
| 9,317,436 | B2 * | 4/2016 | Pan | G06F 12/0871 |
| 9,507,732 | B1 * | 11/2016 | Natanzon | G06F 12/12 |
| 2003/0014520 | A1 | 1/2003 | Rinaldis et al. | |
| 2003/0145165 | A1 * | 7/2003 | Herbst | G06F 3/0601 711/112 |
| 2004/0049643 | A1 * | 3/2004 | Alavarez | G06F 11/1076 711/162 |
| 2004/0236915 | A1 * | 11/2004 | Kawamura | G06F 11/2087 711/162 |
| 2004/0236986 | A1 | 11/2004 | Ng | |
| 2004/0268179 | A1 * | 12/2004 | Stewart | G06F 11/2087 714/6.13 |
| 2005/0251633 | A1 * | 11/2005 | Micka | G06F 11/2058 711/162 |
| 2006/0059306 | A1 * | 3/2006 | Tseng | G06F 3/0607 711/114 |
| 2006/0101216 | A1 * | 5/2006 | Kobayashi | G06F 11/2082 711/162 |
| 2006/0161805 | A1 * | 7/2006 | Tseng | G06F 11/1084 714/6.22 |
| 2006/0277347 | A1 * | 12/2006 | Ashmore | G06F 3/0611 710/313 |
| 2006/0288177 | A1 * | 12/2006 | Shaw | G06F 11/10 711/162 |
| 2007/0101187 | A1 * | 5/2007 | Daikokuya | G06F 11/1076 714/6.22 |
| 2008/0052457 | A1 | 2/2008 | Schilling et al. | |
| 2008/0133831 | A1 * | 6/2008 | Delaney | G06F 3/0613 711/114 |
| 2009/0077414 | A1 * | 3/2009 | Benhase | G06F 11/2058 714/4.11 |
| 2009/0182960 | A1 * | 7/2009 | Crockett | G06F 11/2074 711/162 |
| 2009/0327603 | A1 | 12/2009 | McKean et al. | |
| 2010/0023686 | A1 | 1/2010 | Chen et al. | |
| 2010/0079885 | A1 | 4/2010 | McKean | |
| 2010/0228919 | A1 * | 9/2010 | Stabrawa | G06F 11/1456 711/120 |
| 2010/0332748 | A1 | 12/2010 | Van der Goot et al. | |
| 2011/0296102 | A1 | 12/2011 | Nishihara et al. | |
| 2011/0296105 | A1 | 12/2011 | Yen et al. | |
| 2012/0110252 | A1 | 5/2012 | McKean | |
| 2013/0013848 | A1 * | 1/2013 | Cho | G06F 3/0688 711/103 |
| 2013/0031321 | A1 * | 1/2013 | Shinozaki | G06F 11/2064 711/162 |
| 2013/0054892 | A1 * | 2/2013 | Kannari | G06F 11/2087 711/114 |
| 2016/0154605 | A1 * | 6/2016 | Benhase | G06F 12/0811 711/120 |
| 2016/0154610 | A1 * | 6/2016 | Benhase | G06F 12/0811 711/103 |

OTHER PUBLICATIONS

Sudhakaran, Sareesh. Wolfcrow. Sep. 24, 2012 [retrieved on Sep. 23, 2015]. Retrieved from the Internet: <URL: http://wolfcrow.com/blog/afraid-part-9-raid-01-and-raid-10/>.*

Sattari, Hamed. Promise Pegasus R4/R6 Thunderbolt Review. Aug. 4, 2011 [retrieved on Sep. 23, 2015]. Retrieved from the Internet: <URL: http://hamed.dk/blog/101-pegasus-r4-r6-review>.*

Microsoft Corporation, Microsoft Computer Dictionary, 2002, Microsoft Press, Fifth Edition, p. 558.*

* cited by examiner

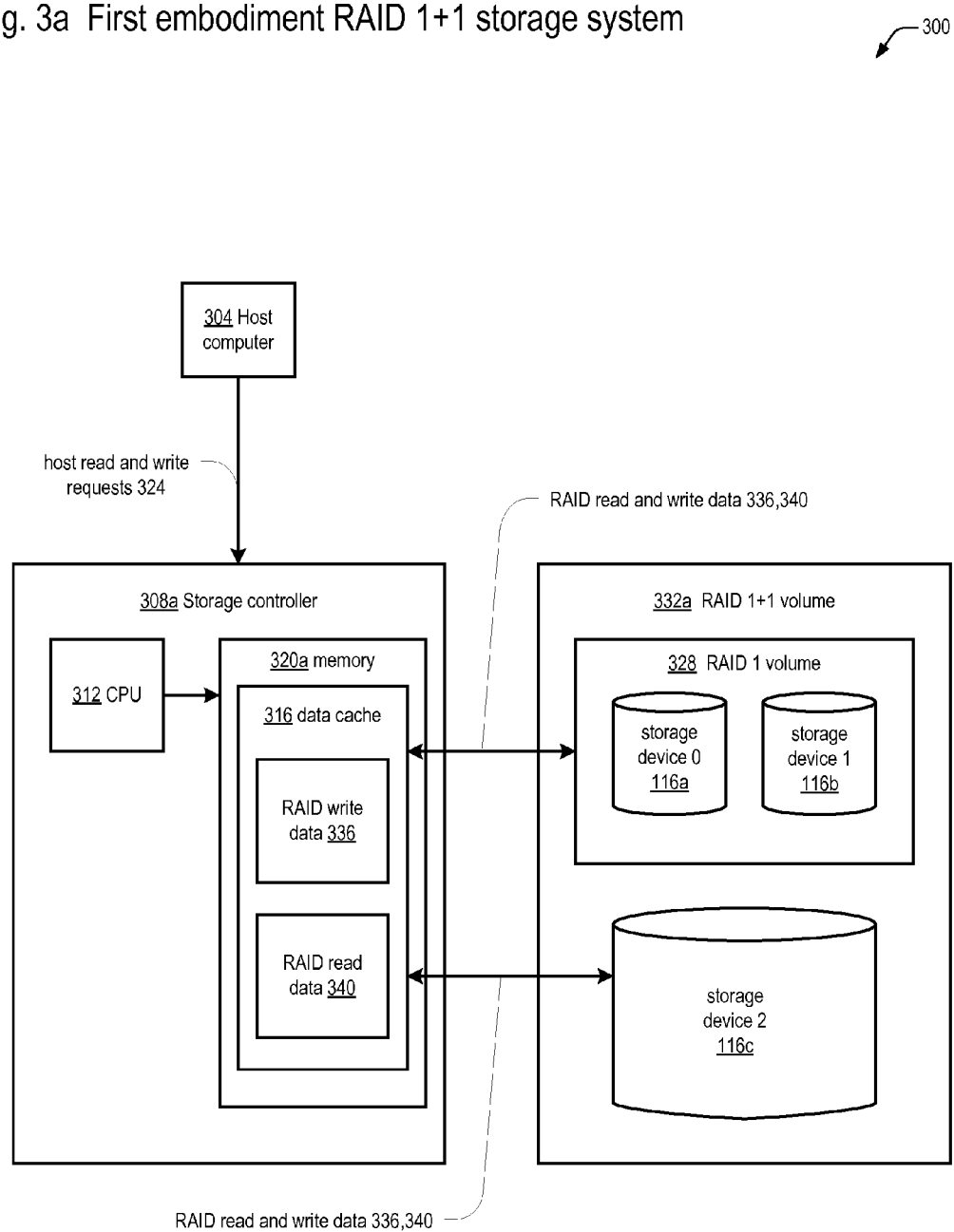
Fig. 3a First embodiment RAID 1+1 storage system

Fig. 3b Second embodiment RAID 1+1 storage system
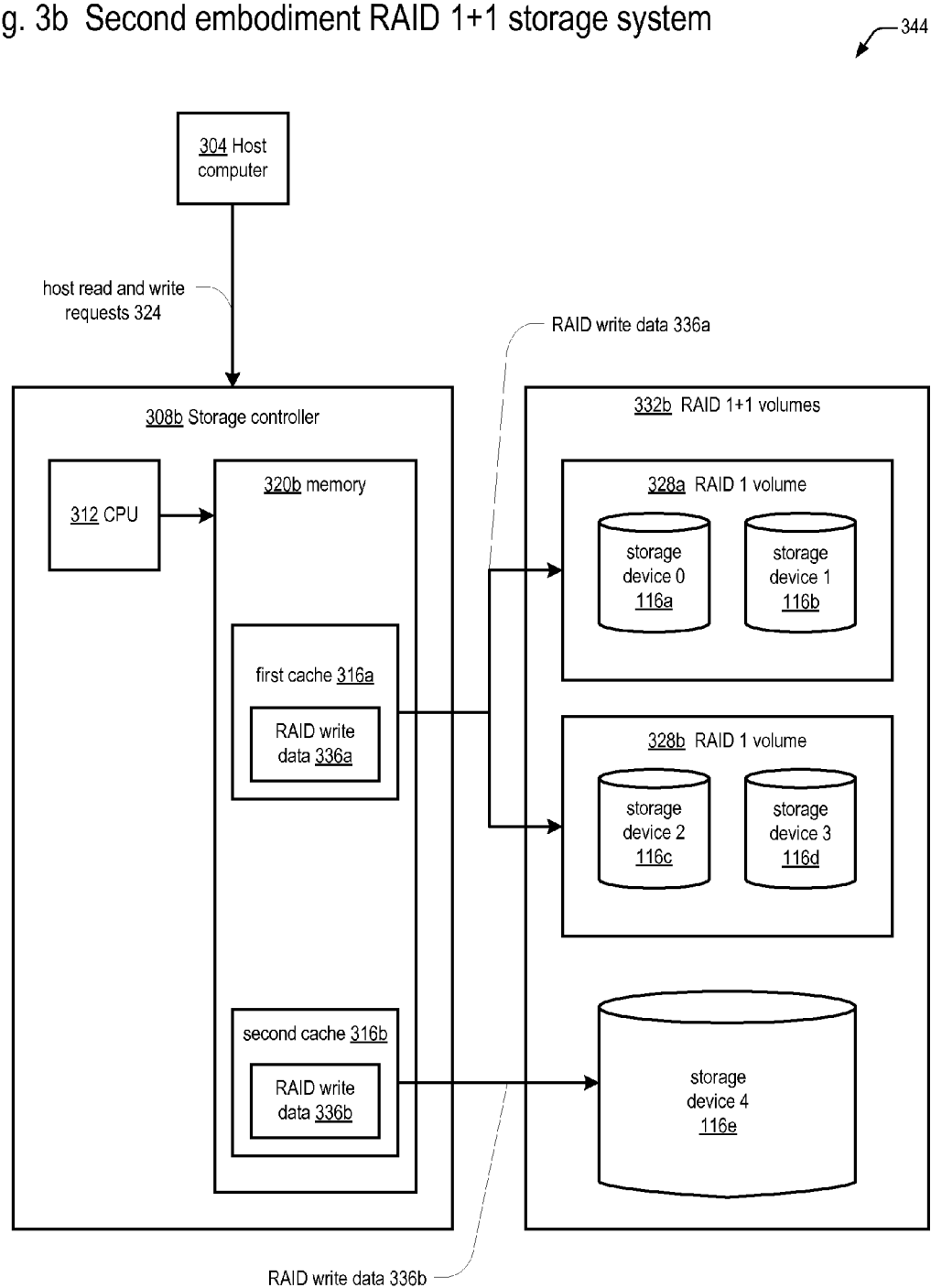

Fig. 4  RAID 1 and 10 arrays with dual redundancy
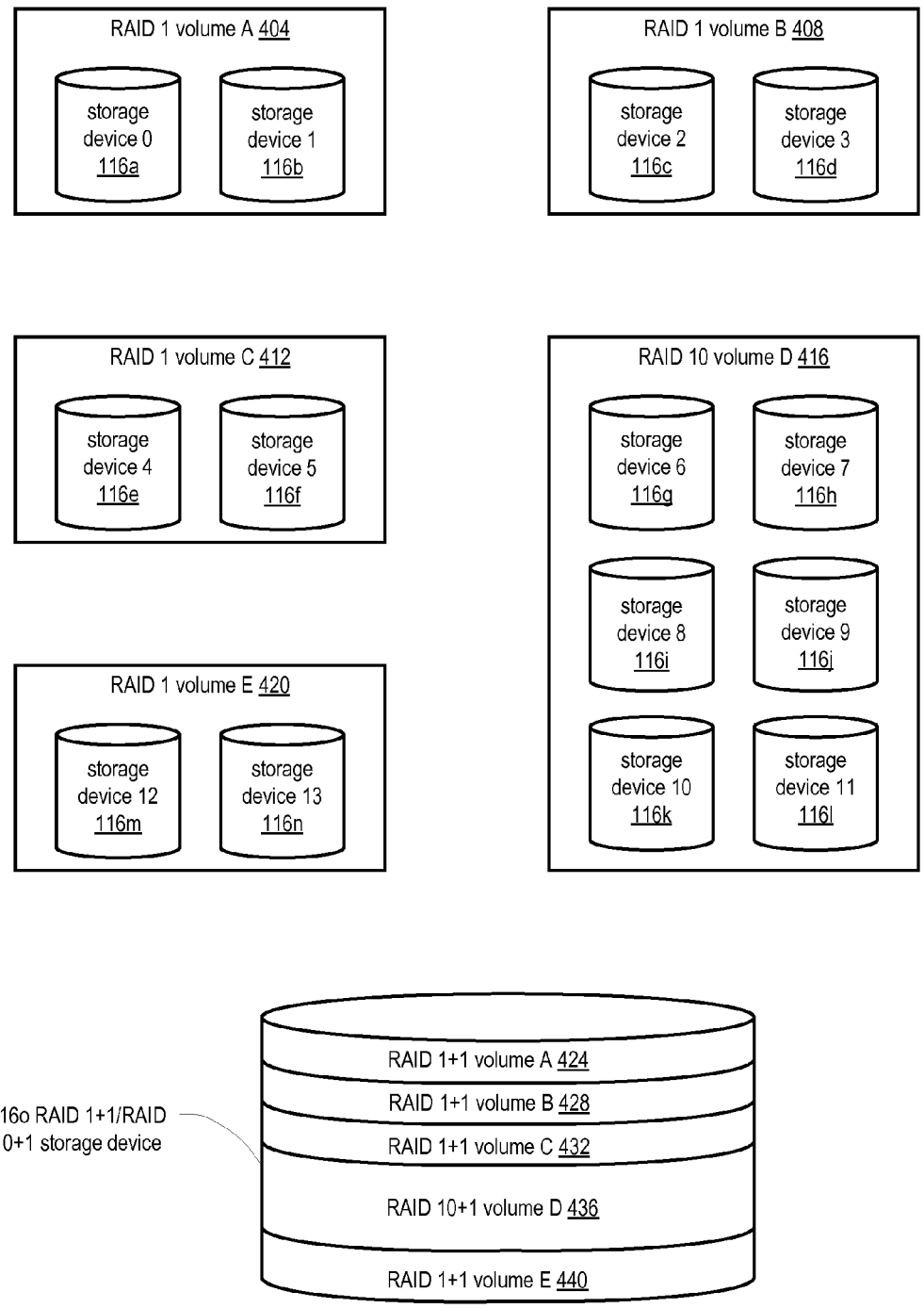

Fig. 5 Data striping on primary and secondary storage devices
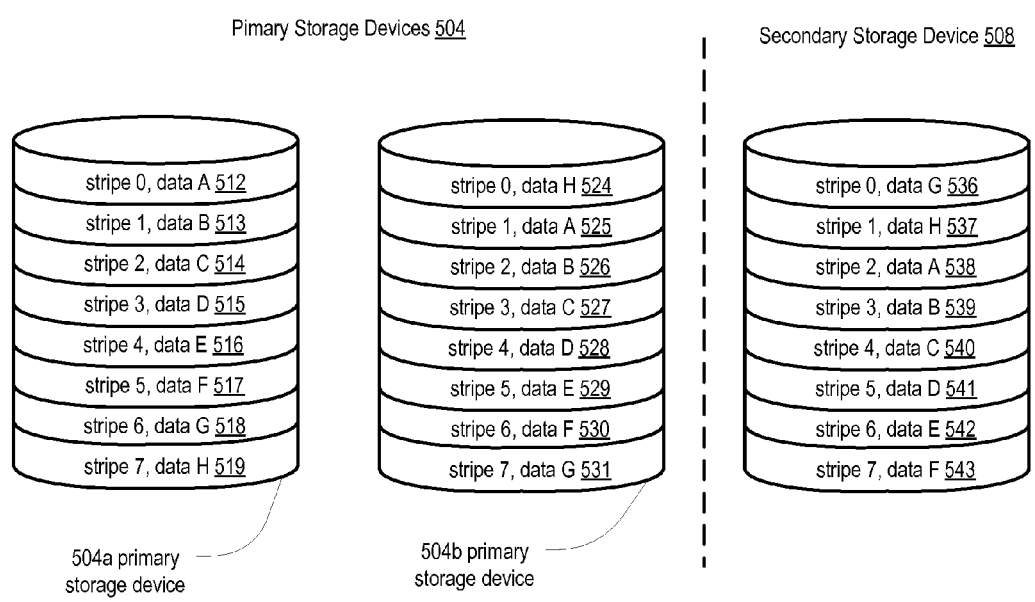

Fig. 6a First embodiment RAID 10+1 array chunk distribution
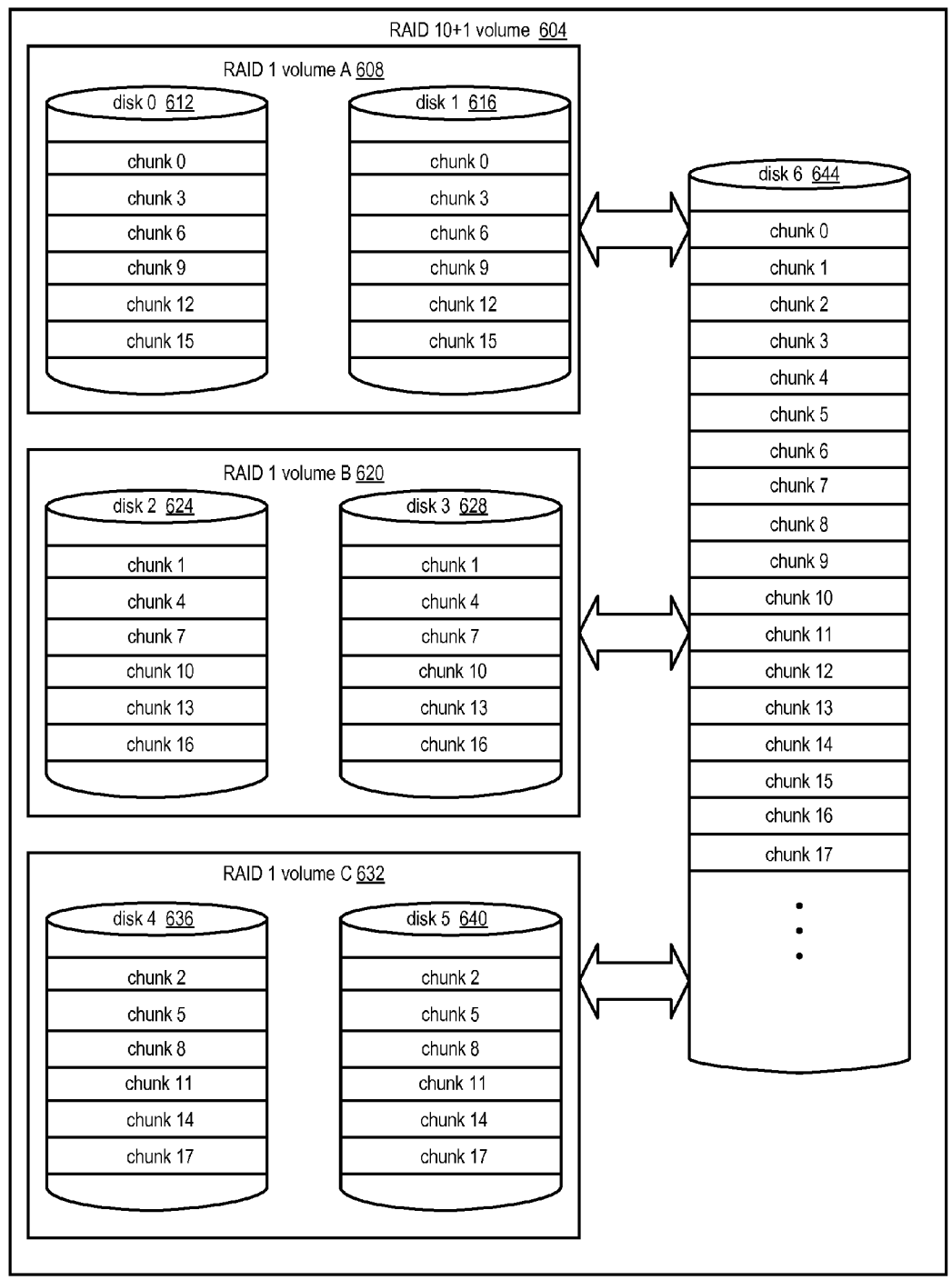

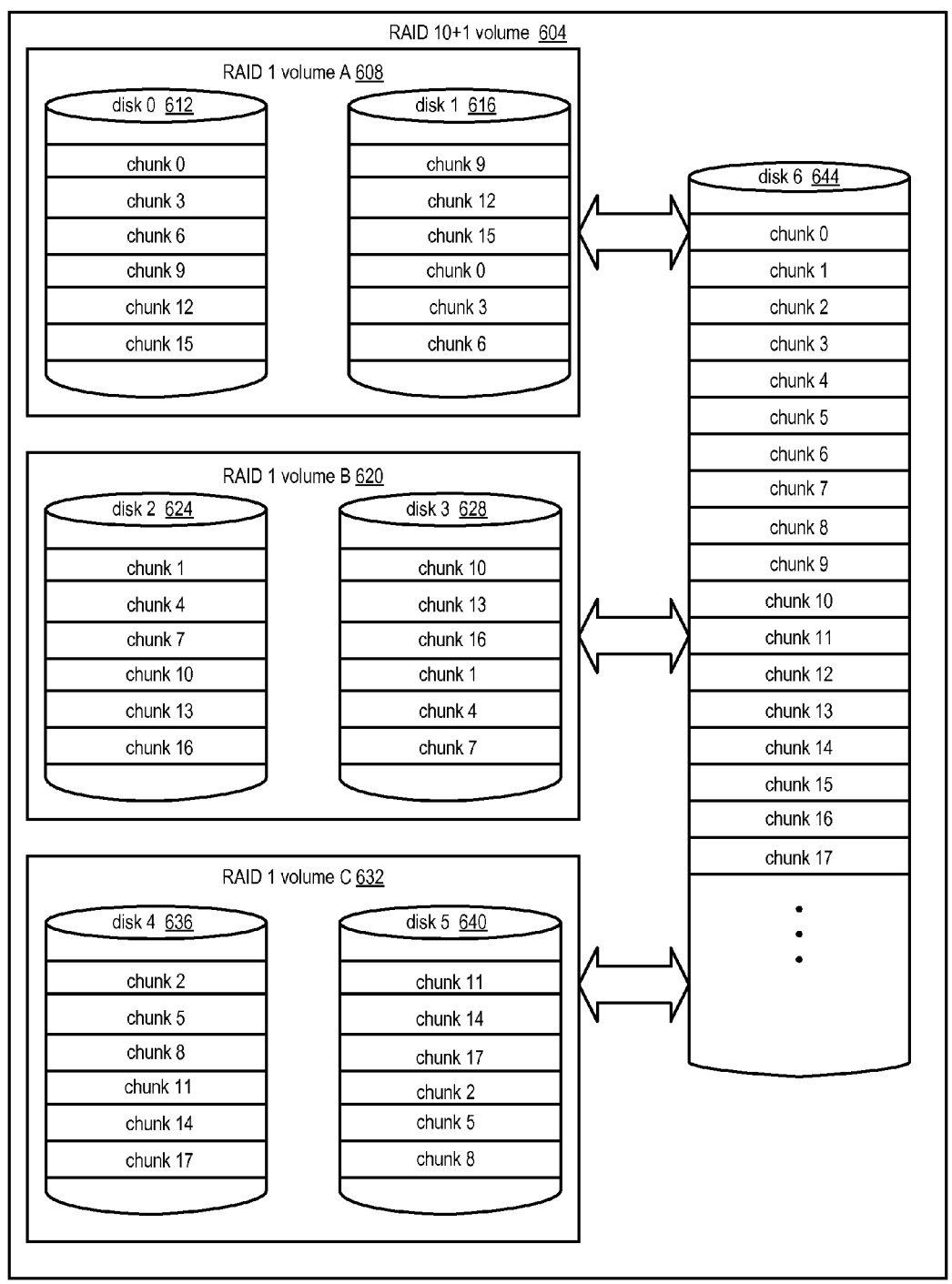
Fig. 6b  Second embodiment RAID 10+1 array chunk distribution

Fig. 6c   Third embodiment RAID 10+1 array chunk distribution
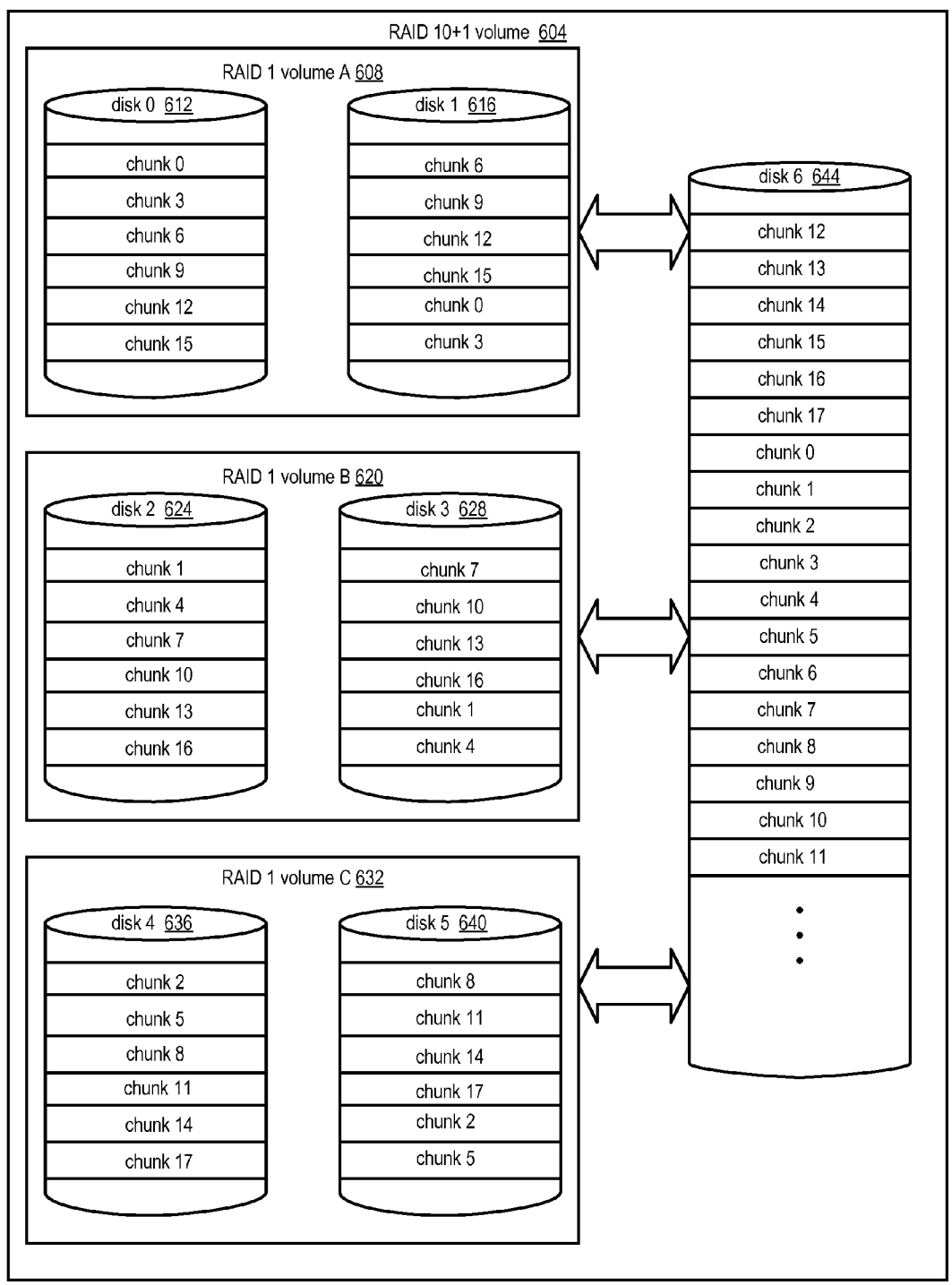

Fig. 7a First embodiment data read operation
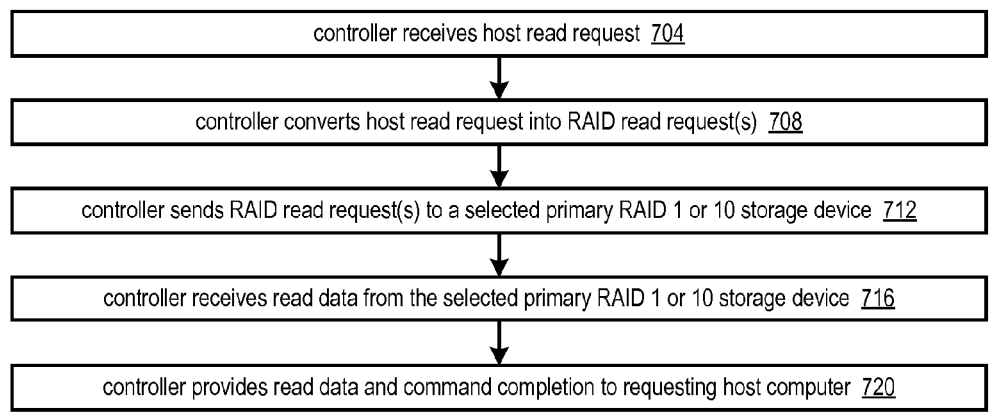

Fig. 7b  First embodiment data write operation
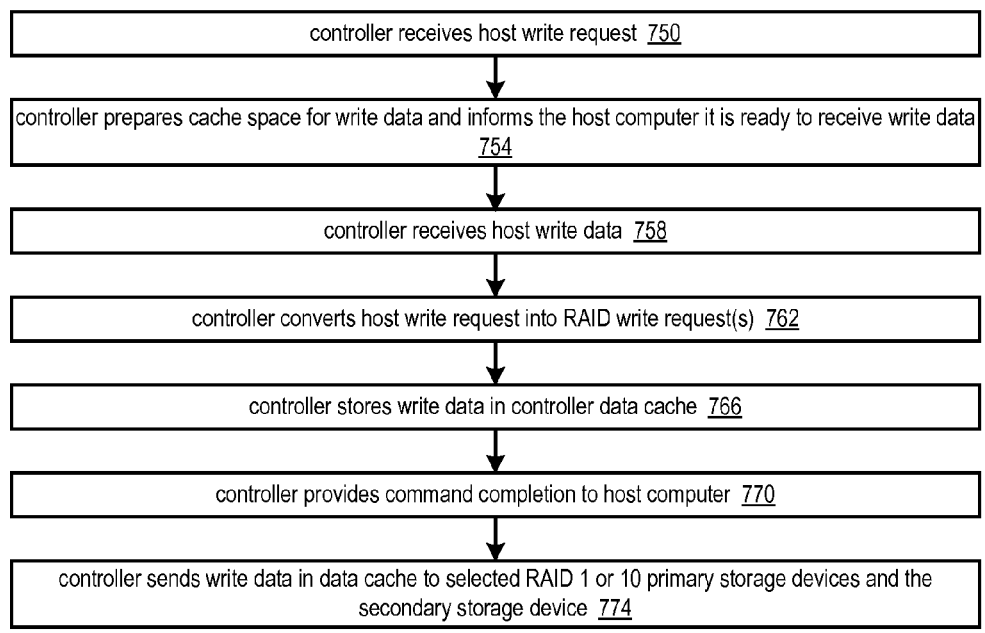

Fig. 8a  Second embodiment data read operation
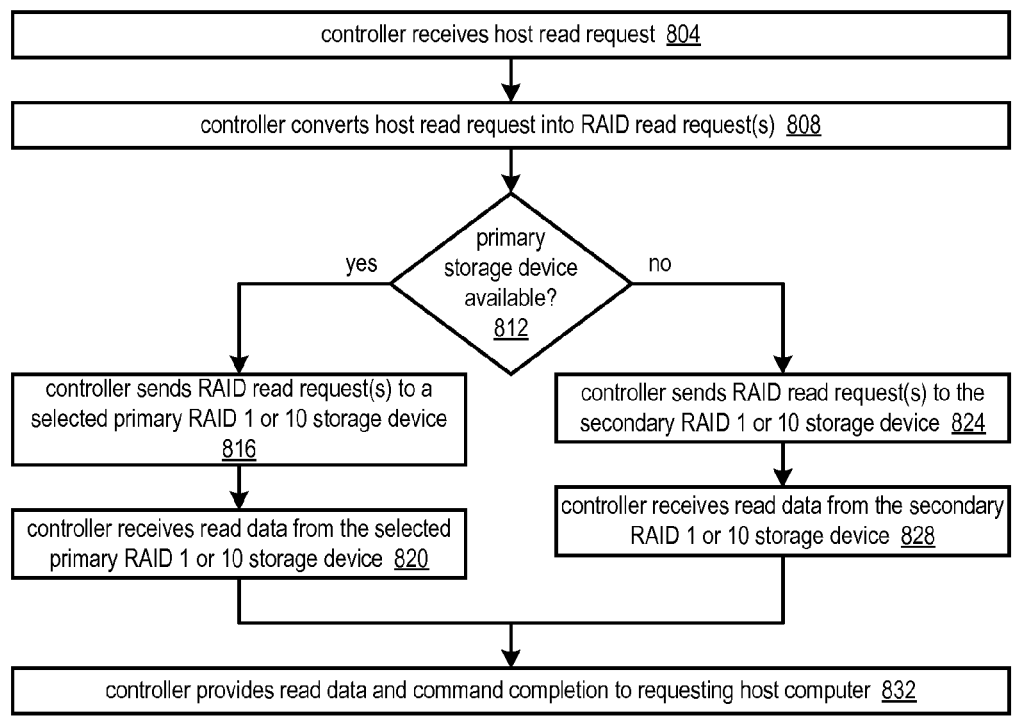

Fig. 8b  Second embodiment data write operation
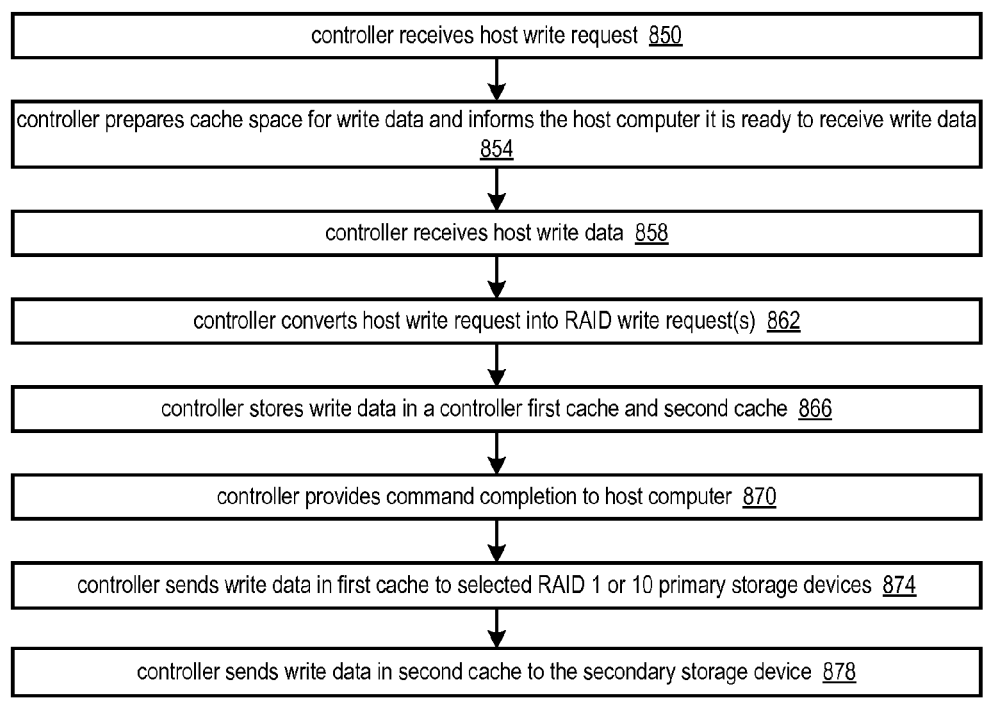

Fig. 9   Data read operation involving secondary storage device
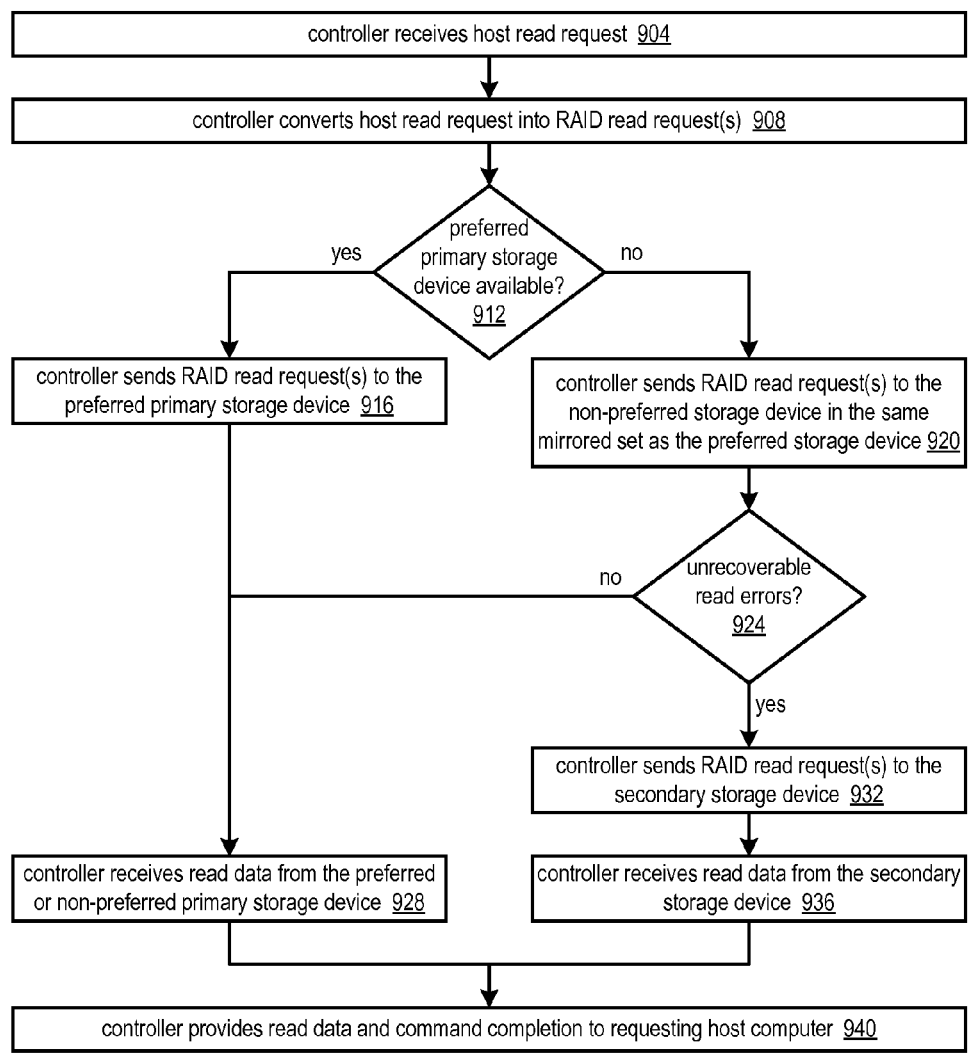

MIRRORED DATA STORAGE WITH IMPROVED DATA RELIABILITY

CROSS REFERENCE TO RELATED APPLICATION(S)

This application claims the benefit of U.S. Provisional Application Ser. No. 61/774,177 filed Mar. 7, 2013, entitled MIRRORED DATA STORAGE WITH IMPROVED DATA RELIABILITY, which is hereby incorporated by reference for all purposes and which were owned or subject to an obligation of assignment to Dot Hill Systems Corporation at the time the invention claimed herein was made.

FIELD

The present invention is directed to computer data storage. In particular, the present invention is directed to methods and apparatuses for high performance redundant data storage.

BACKGROUND

The need to store digital files, documents, pictures, images and other data continues to increase rapidly. In connection with the electronic storage of data, systems incorporating more than one storage device have been devised. In general, using a number of storage devices in a coordinated fashion in order to store data can increase the total storage volume of the system. In addition, data can be distributed across the multiple storage devices such that data will not be irretrievably lost if one of the storage devices (or in some cases more than one storage device) fails. An additional advantage that can be achieved by coordinating the operation of a number of individual storage devices is improved data access and/or storage times. Examples of systems that can provide such advantages can be found in the various RAID (redundant array of independent disks) levels that have been developed.

For instance, RAID level 0 implements a striped array in which data is broken into blocks or strips that are written to separate disk drives. This has the effect of improving the data access and storage times as compared to, for example, a system in which all of the data blocks are stored on a single storage device, by spreading the individual input/output (I/O) requests across a number of physical storage devices. Furthermore, RAID level 0 can be implemented with two or more storage devices. However, RAID level 0 is not fault tolerant. That is, a failure of even one storage device within a RAID level 0 array results in the irretrievable loss of data from that array.

RAID level 1, or RAID 1, is an example of a fault tolerant RAID level. According to RAID level 1, data stored in a primary storage device is mirrored on a secondary storage device. Accordingly, RAID level 1 requires at least two storage devices to implement. Furthermore, if more than two storage devices are desired, additional storage devices are added in pairs. That is, RAID level 1 requires an even number of storage devices. During normal operation, read operations are made with respect to a copy of data on a first physical storage device, and write operations result in a copy of data being written to the first physical storage device and a mirrored copy being written to a second physical first physical storage device. If one first physical storage device within a RAID level 1 array fails, data stored on that storage device can be rebuilt onto a replacement storage device by copying the data stored on the failed storage device's companion storage device to the replacement storage device. However, RAID level 1 does not provide improved I/O performance as compared to storing data on a single storage device. Furthermore, because the write transaction rate during normal operation is doubled, certain implementations of RAID level 1 can result in decreased performance as compared to storing data on a single storage device.

Another example of a storage array is RAID level 0+1. In general, RAID level 0+1 comprises paired RAID level 0 arrays. As a result, data can be striped across multiple storage devices, improving I/O performance. By striping copies of the data across additional storage devices, redundancy is provided. The disadvantages of RAID level 0+1 include the minimum requirement of four storage devices and the need to maintain an even number of storage devices in arrays incorporating more than four storage devices.

In RAID level 1+0 (also known as RAID level 10 or RAID 10), two or more storage devices are mirrored together, and then the mirrors are striped together. Like RAID levels 1 and 0+1, a RAID level 1+0 configuration provides fault tolerance if one storage device from each mirror fails. However, the I/O performance of a RAID 1+0 array is not as good as a striped array without mirroring, such as RAID level 0.

Other RAID levels combine independent data storage devices with parity, either stored on a dedicated parity storage device or distributed among data storage devices. Examples of such arrangements include RAID levels 3, 4, 5 and 6. Although such arrangements provide for fault tolerance, they all require at least three storage devices to implement, and require fairly complex controller and parity generation circuitry or software. Additionally, writes to parity-protected RAID arrays are slower than mirrored arrays due to the requirement to calculate new parity for each write I/O.

RAID 1 provides fault-tolerance because two storage devices in the "mirror" contain the same data. It provides good random read performance, because a single storage device can deliver the data. It provides good random write performance, because there is no read-modify-write operations needed for parity calculations. However, it is expensive, because the user gets only 50% usable storage device space. While RAID 1 does provide fault-tolerance, it is limited because it is only single-storage device fault tolerant.

SUMMARY

The present invention is directed to solving disadvantages of the prior art. In accordance with embodiments of the present invention, a plurality of arrays of storage devices, each providing dual storage device redundancy, is provided. The plurality of arrays of storage devices includes a plurality of mirrored sets of primary storage devices, each including an even number of at least two or more physical primary storage devices. Each of the mirrored sets of primary storage devices stores a first and a second copy of data. The plurality of arrays of storage devices also includes a secondary storage device, which is a single physical storage device that stores a third copy of the data stored on each of the plurality of mirrored sets of primary storage devices. The secondary storage device has at least the capacity to store the data stored on the plurality of mirrored sets of primary storage devices. Dual storage device redundancy preserves data if data cannot be read from one or two physical storage devices in any array.

In accordance with another embodiment of the present invention, a storage controller providing dual storage device redundancy is provided. The storage controller includes a processor and a memory, coupled to the processor. The memory includes a first cache and a second cache. The storage controller stores RAID write data in the first cache and the second cache. RAID write data in the first cache is provided to a mirrored set of primary storage devices, and RAID write data in the second cache is provided to a secondary storage device. The secondary storage device has at least the capacity to store the data stored on a plurality of mirrored sets of primary storage devices including the mirrored set of primary storage devices. An array includes the mirrored set of primary storage devices and the secondary storage device. Dual storage device redundancy preserves data if one or two storage devices in the array fail.

In accordance with yet another embodiment of the present invention, a storage system for providing dual storage device redundancy is provided. The storage system includes a storage controller. The storage controller includes a processor and a memory, coupled to the processor. The memory includes a data cache and a parity cache. The storage system also includes an array, which includes a mirrored set of primary storage devices and a secondary storage device. The mirrored set of primary storage devices has higher performance characteristics than the secondary storage device. The secondary storage device has a higher storage capacity than the mirrored set of primary storage devices. The storage controller stores RAID write data in the data cache and the parity cache. The storage controller writes RAID write data in the data cache to the mirrored set of primary storage devices. The storage controller writes RAID write data in the parity cache to the secondary storage device. The primary storage devices have higher performance characteristics than the secondary storage device. Dual storage device redundancy preserves data if one or two storage devices in the array fail.

An advantage of the present invention is it provides an economical storage array that provides for dual storage device redundancy without the complexity and cost of parity generation and storage. Because redundancy is provided by mirroring, slower and more complex XOR operations can be avoided. Furthermore, dual redundant storage systems that utilize RAID 6 require two-dimensional XOR computations that require more time to compute and hardware or software cost to implement.

Another advantage of the present invention is it provides good read and write performance compared to a single storage device. Read operations are routinely routed to faster primary storage devices that can provide read data faster than a secondary storage device. Write operations to a slower secondary storage device can be buffered through a different cache memory than write operations to the primary storage devices, resulting in the primary storage devices able to proceed with other read or write operations without waiting for the secondary storage device write to complete.

Yet another advantage of the present invention is it allows a $3^{rd}$ or secondary storage device to be used with lower performance characteristics than the primary storage devices. This saves costs by not requiring a higher performance storage device to be used to store a $3^{rd}$ copy of data. Furthermore, the secondary storage device can be significantly larger than the primary storage devices, thus allowing the same secondary storage device to be used with multiple RAID 1 or 10 arrays.

Additional features and advantages of embodiments of the present invention will become more readily apparent from the following description, particularly when taken together with the accompanying drawings.

BRIEF DESCRIPTION OF THE DRAWINGS

FIG. 3a is a block diagram illustrating a RAID 1+1 storage system in accordance with a first embodiment of the present invention.

FIG. 3b is a block diagram illustrating a RAID 1+1 storage system in accordance with a second embodiment of the present invention.

FIG. 4 is a block diagram illustrating RAID 1 and RAID 10 arrays with dual redundancy in accordance with the preferred embodiment of the present invention.

FIG. 5 is a block diagram illustrating data striping on primary and secondary storage devices in accordance with the preferred embodiment of the present invention.

FIG. 6a is a block diagram illustrating a first embodiment RAID 10+1 array chunk distribution in accordance with the present invention.

FIG. 6b is a block diagram illustrating a second embodiment RAID 10+1 array chunk distribution in accordance with the present invention.

FIG. 6c is a block diagram illustrating a third embodiment RAID 10+1 array chunk distribution in accordance with the present invention.

FIG. 7a is a flowchart illustrating a data read operation in accordance with a first embodiment of the present invention.

FIG. 7b is a flowchart illustrating a data write operation in accordance with a first embodiment of the present invention.

FIG. 8a is a flowchart illustrating a data read operation in accordance with a second embodiment of the present invention.

FIG. 8b is a flowchart illustrating a data write operation in accordance with a second embodiment of the present invention.

FIG. 9 is a flowchart illustrating a data read operation involving a secondary storage device in accordance with a second embodiment of the present invention.

DETAILED DESCRIPTION

The present invention is directed to methods, apparatuses, and systems for providing dual storage device redundancy while preserving aggregate storage device performance similar to a single storage device.

Figure 1A:
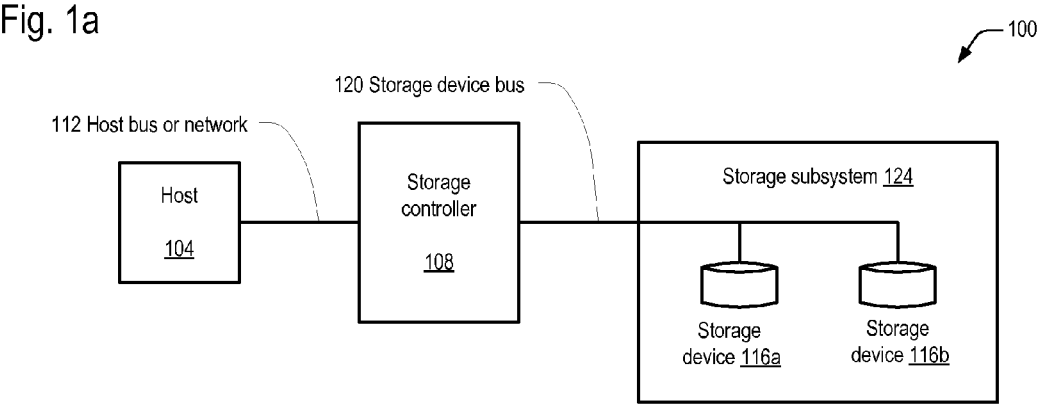
FIG. 1a is a block diagram illustrating components of a first non host-based data storage system in accordance with embodiments of the present invention.

Referring now to FIG. 1a, a block diagram illustrating components of a first non host-based data storage system 100 in accordance with embodiments of the present invention is shown.

The data storage system 100 includes one or more host computers 104. Host computer 104 is generally a server, but could also be a desktop or mobile computer. Host computer 104 executes application programs that generate read and write requests to storage controller 108 over host bus or network 112. Host bus or network 112 in one embodiment is a bus such as SCSI, FC-AL, USB, Firewire, SSA, SAS, SATA, or Infiniband. In another embodiment, host bus or network 112 is a network such as Ethernet, iSCSI, Fiber Channel, SSA, ESCON, ATM, FICON, or Infiniband.

Host computer 104 interfaces with one or more storage controllers 108, although only a single storage controller 108 is illustrated for clarity. In one embodiment, storage controller 108 is a RAID controller. In another embodiment, storage controller 108 is a storage appliance such as a provisioning, virtualization, replication, or backup appliance. Storage controller 108 transfers data to and from storage devices 116a, 116b in storage subsystem 124, over storage device bus 120. Storage device bus 120 is any suitable storage bus or group of buses for transferring data directly between storage controller 108 and storage devices 116, including but not limited to SCSI, Fiber Channel, SAS, SATA, or SSA.

Storage subsystem 124 in one embodiment contains twelve storage devices 116. In other embodiments, storage subsystem 124 may contain fewer or more than twelve storage devices 116. Storage devices 116 include various types of storage devices, including hard disk drives, solid state drives, optical drives, and tape drives. Within a specific storage device type, there may be several sub-categories of storage devices 116, organized according to performance. For example, hard disk drives may be organized according to cache size, drive RPM (5,400, 7,200, 10,000, and 15,000, for example), queue depth, random transfer rate, or sequential transfer rate.

Figure 1B:
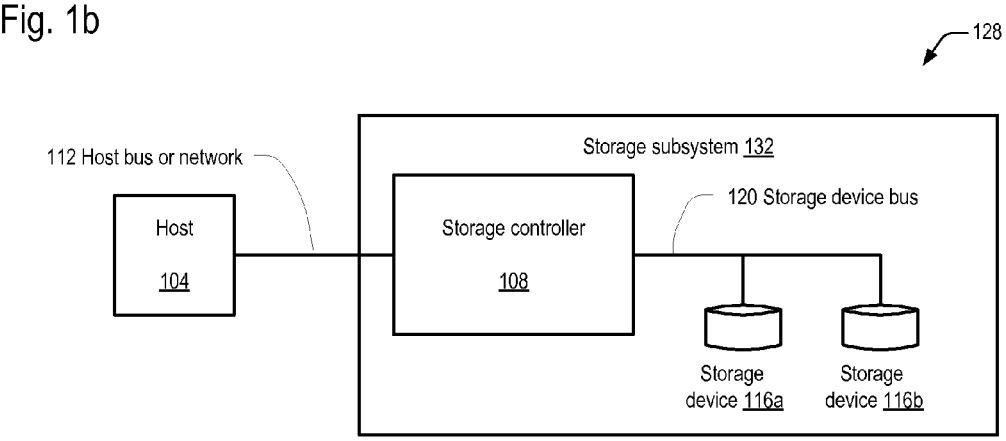
FIG. 1b is a block diagram illustrating components of a second non host-based data storage system in accordance with embodiments of the present invention.

Referring now to FIG. 1b, a block diagram illustrating components of a second non host-based data storage system 128 in accordance with embodiments of the present invention is shown. Non host-based data storage system 128 is similar to non host-based data storage system 100, with the exception being storage controller 108 is within storage subsystem 132, along with storage devices 116. In the embodiment illustrated in FIG. 1b, storage controller 108 is a single RAID controller 108. However, in other embodiments, storage controller 108 represents multiple RAID controllers 108.

Figure 1C:
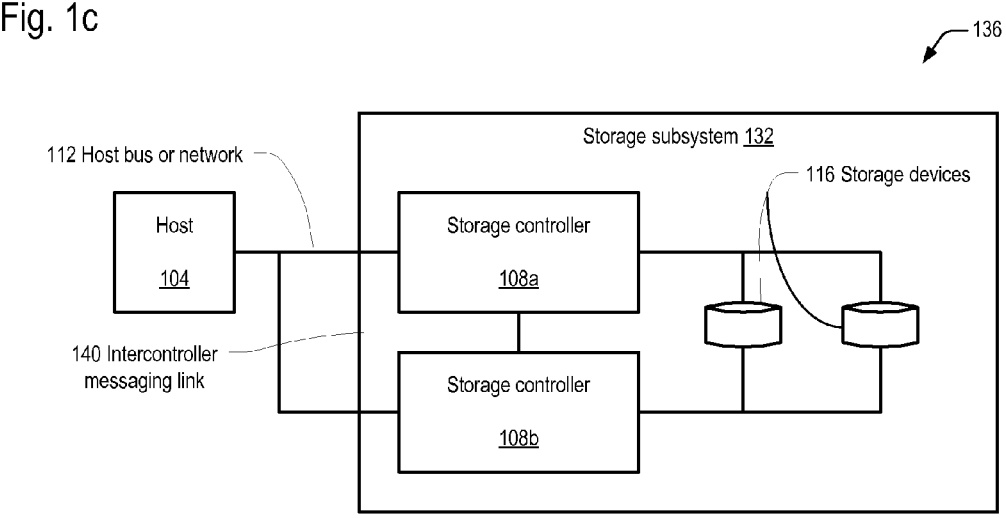
FIG. 1c is a block diagram illustrating components of a third non host-based data storage system in accordance with embodiments of the present invention.

Referring now to FIG. 1c, a block diagram illustrating components of a third host-based data storage system 136 in accordance with embodiments of the present invention is shown. Data storage system 136 is similar to data storage systems 100 and 128, except storage controller 108 represents two redundant storage controllers 108a, 108b. In one embodiment, storage controllers 108a, 108b utilize active-active failover in order to have continued availability to storage devices 116 by host 104 in the event of a failure of one of storage controllers 108a, 108b. Inter-controller messaging link 140 provides a communication and data path between storage controllers 108a, 108b in order to mirror write data and synchronize failover and failback operations.

Figure 2A:
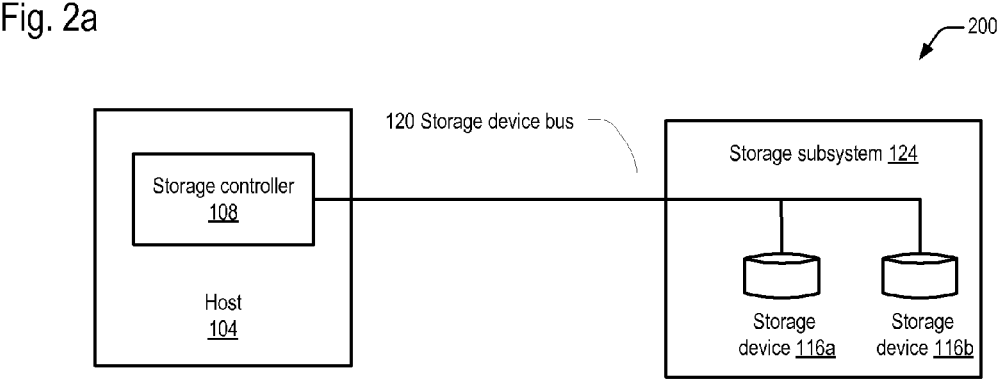
FIG. 2a is a block diagram illustrating components of a first host-based data storage system in accordance with embodiments of the present invention.

Referring now to FIG. 2a, a block diagram illustrating components of a first host-based data storage system 200 in accordance with embodiments of the present invention is shown. First host-based data storage system 200 is similar to first non host-based storage system 100 of FIG. 1a, except storage controller 108 is within host computer 104. Storage controller 108 interfaces through a local bus of host computer 104, where the local bus may be any suitable bus for high speed transfers between the CPU of host computer 104 and storage controller 108, including Rapid IO, PCI, PCI-X, or PCI Express. Storage controller 108 may either be integrated on the motherboard of host computer 104, or may be an add-in board or other form of assembly in host computer 104.

Figure 2B:
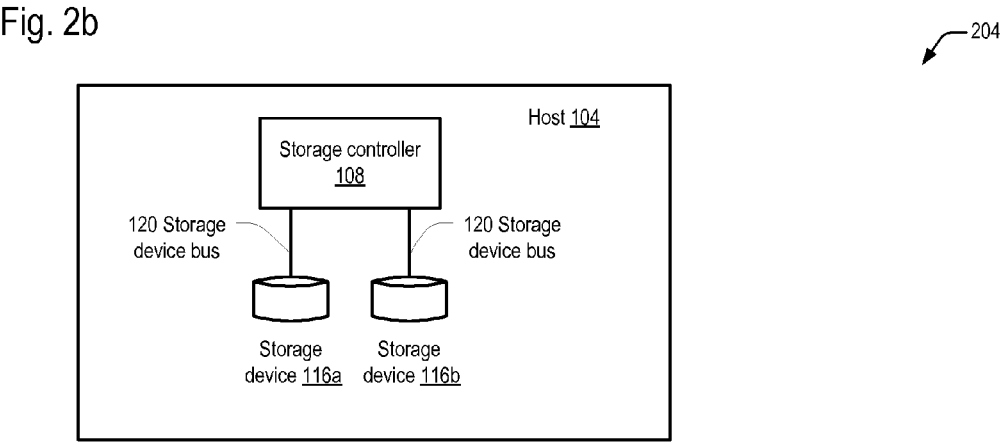
FIG. 2b is a block diagram illustrating components of a second host-based data storage system in accordance with embodiments of the present invention.

Referring now to FIG. 2b, a block diagram illustrating components of a second host-based data storage system 204 in accordance with embodiments of the present invention is shown. Second host-based data storage system 204 integrates the functions of storage subsystem 124 into host computer 104. Data storage system 204 represents a self-contained highly integrated data storage system.

Figure 2C:
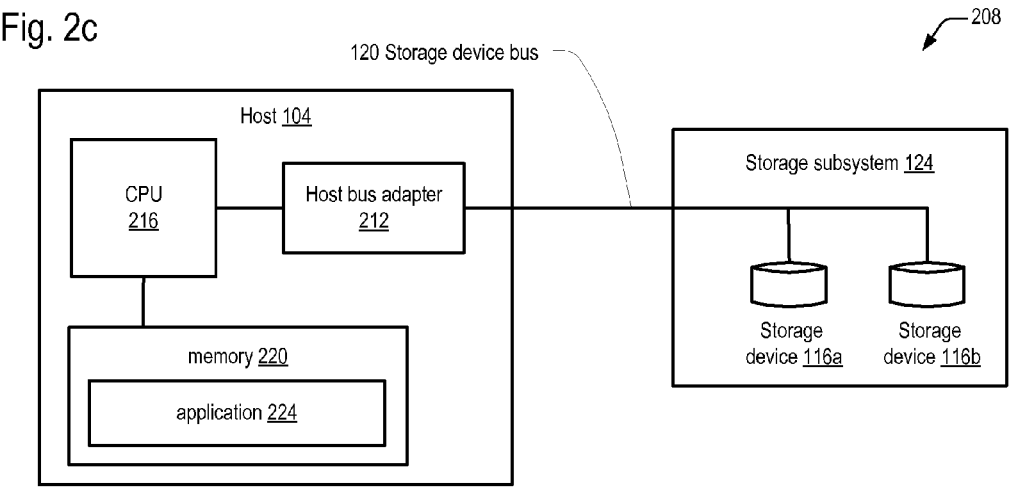
FIG. 2c is a block diagram illustrating components of a third host-based data storage system in accordance with embodiments of the present invention.

Referring now to FIG. 2c, a block diagram of illustrating components of a third host-based data storage system 208 in accordance with embodiments of the present invention is shown. Third host-based data storage system 208 is similar to first host-based data storage system 200, but instead of an integrated storage controller 108, a software-based approach is used. Interface between host computer 104 and storage device bus 120 is provided by host bus adapter 212, which provides appropriate data and command buffering functions as well as protocol control and low-level error handling. CPU 216 executes applications 224 in memory 220 to control data flow between memory 220 and storage devices 116a, 116b in storage subsystem 124.

Referring now to FIG. 3a, a block diagram illustrating a RAID 1+1 storage system 300 in accordance with a first embodiment of the present invention is shown. Data storage system 300 includes one or more host computers 304 interconnected to a storage controller 308a through bus or network 112. Host computer 104 generates host read and write requests 324 to storage controller 308a, which storage controller 308a converts into RAID read and write requests.

Storage controller 308a includes a CPU or processor 312, which executes program instructions stored in a memory 320a coupled to the CPU 312. CPU 312 includes any processing device suitable for executing storage controller 308a programs, such as Intel x86-compatible processors, embedded processors, mobile processors, and/or RISC processors. CPU 312 may include several devices including field-programmable gate arrays (FPGAs), memory controllers, North Bridge devices, and/or South Bridge devices.

Memory 320a may be one or more forms of volatile memory 320a, non-volatile memory 320a, or a combination of both volatile and non-volatile memories 320a. The memory 320a includes firmware which includes program instructions that CPU 312 fetches and executes, including program instructions for the processes of the present invention. Examples of non-volatile memory 320a include, but are not limited to, flash memory, SD, EPROM, EEPROM, hard disks, and NOVRAM. Volatile memory 320a stores various data structures and user data. Examples of volatile memory 320a include, but are not limited to, SRAM, DDR RAM, DDR2 RAM, DDR3 RAM, Z-RAM, TTRAM, A-RAM, ETA RAM, and other forms of temporary memory.

Memory 320a includes a data cache 316, which stores RAID write data 336 and RAID read data 340. RAID write data 336 is written to storage devices 116 in RAID 1+1 volume 332a coupled to storage controller 308a. RAID read data 340 is read from storage devices 116. Although FIG. 3a illustrates RAID write data 336 and RAID read data 340 stored in the same data cache 316, it should be understood that RAID write data 336 may be stored in a different data cache 316 from RAID read data 340.

Storage controller 308a is coupled to RAID 1+1 volume 332a, which includes three or more storage devices 116.

Storage device 0 116a and storage device 1 116b are primary storage devices 116, and make up RAID 1 volume 328, and storage device 2 116c is a secondary storage device 116, and provides dual data redundancy for RAID 1+1 volume 332a. Frequently accessed data is generally read from storage devices 116a and 116b into the RAID read data 340 of data cache 316, where it can be provided in response to host read requests 324 much faster than directly from the storage devices 116. However, in some cases where RAID read data 340 is not available from primary storage devices 116a, 116b, RAID read data 340 is read from the secondary storage device 116c. This is illustrated in the process of FIG. 9.

It should be understood that storage controller 308a may be functionally organized in countless different functional organizations and architectures without diverting from the scope or operation of the present invention. Additionally, many different storage volumes 332 may be controlled by storage controller 308a, including storage volumes 332a of RAID 1 and RAID 10 including any number of storage devices 116.

Referring now to FIG. 3b, a block diagram illustrating a RAID 1+1 storage system 344 in accordance with a second embodiment of the present invention is shown. Data storage system 344 includes one or more host computers 304 interconnected to a storage controller 308b through bus or network 112. Host computer 304 generates host read and write requests 324 to storage controller 308b, which storage controller 308b converts into RAID read and write requests.

Storage controller 308b includes a CPU or processor 312, which executes program instructions stored in a memory 320b coupled to the CPU 312. CPU 312 includes any processing device suitable for executing storage controller 308b programs, such as Intel x86-compatible processors, embedded processors, mobile processors, and/or RISC processors. CPU 312 may include several devices including field-programmable gate arrays (FPGAs), memory controllers, North Bridge devices, and/or South Bridge devices.

Memory 320b may be one or more forms of volatile memory 320b, non-volatile memory 320b, or a combination of both volatile and non-volatile memories 320b. The memory 320b includes firmware which includes program instructions that CPU 312 fetches and executes, including program instructions for the processes of the present invention. Examples of non-volatile memory 320b include, but are not limited to, flash memory, SD, EPROM, EEPROM, hard disks, and NOVRAM. Volatile memory 320b stores various data structures and user data. Examples of volatile memory 320b include, but are not limited to, SRAM, DDR RAM, DDR2 RAM, DDR3 RAM, Z-RAM, TTRAM, A-RAM, ETA RAM, and other forms of temporary memory.

Memory 320b includes a first cache 316a, which stores RAID write data 336a and a second cache 316b, which stores RAID write data 336b. RAID read data 340 is not shown in FIG. 3b, but may be stored in any of first cache 316a, second cache 316b, or anywhere else in memory 320b. In the preferred embodiment, the second cache 316b is a parity cache. Parity cache memory is required to store parity data for parity-based RAID arrays including RAID 3, RAID 4, RAID 5, or RAID 6. However, if no parity-based RAID arrays are controlled by storage controller 308a, 308b, then the parity cache is otherwise unused and can be allocated for the second cache 316 of FIG. 3b.

Storage controller 308b is coupled to RAID 1+1 volumes 332b. A first RAID 1+1 volume 332b includes RAID 1 volume 328a and storage device 4 116e, a secondary storage device 116. RAID 1 volume 328a includes storage device 0 116a and storage device 1 116b. A second RAID 1+1 volume 332b includes RAID 1 volume 328b and storage device 4 116e, a secondary storage device 116. RAID 1 volume 328b includes storage device 2 116c and storage device 3 116d. Many different storage volumes 332b may be controlled by storage controller 308b, including storage volumes 332b of RAID 1 and RAID 10 including any number of storage devices 116.

RAID 1+1 volumes 332b is a plurality of arrays of storage devices 116, where each array of storage devices 116 provides dual storage device redundancy. A first array of storage devices 116 includes RAID 1 volume 328a and a secondary storage device, storage device 4 116e. RAID 1 volume 328b is also a mirrored set of primary storage devices 116. A second array of storage devices 116 includes RAID 1 volume 328b and the secondary storage device, storage device 4 116e. RAID 1 volume 328b is a mirrored set of primary storage devices 116. The secondary storage device 116e has at least the capacity to store the data stored on all of the mirrored sets of primary storage devices 328a and 328b.

RAID write data 336a, 336b is written to storage devices 116 in RAID 1+1 volumes 332b coupled to storage controller 308b. Specifically, the storage controller 308b writes RAID write data 336a to primary storage devices 116a, 116b, 116c, and 116d and writes RAID write data 336b to secondary storage device 116e. This will be described in more detail with respect to FIG. 8b. Although FIG. 3b illustrates RAID write data 336a and RAID write data 336b stored in separate cache memories 316a and 316b, it should be understood that RAID write data 336a and 336b may be stored in different regions of the same data cache 316.

It should be understood that storage controller 308b may be functionally organized in countless different functional organizations and architectures without diverting from the scope or operation of the present invention.

Referring now to FIG. 4, a block diagram illustrating RAID 1 and RAID 10 arrays with dual redundancy in accordance with the preferred embodiment of the present invention is shown.

Illustrated in FIG. 4 are five storage volumes. Four volumes are RAID 1 volumes, identified as RAID 1 volume A 404, RAID 1 volume B 408, RAID 1 volume C 412, and RAID 1 volume E 420. FIG. 4 also depicts one RAID 10 volume, identified as RAID 10 volume D 416. RAID 1 volume A 404 is stored on storage devices 116a and 116b. RAID 1 volume B 408 is stored on storage devices 116c and 116d. RAID 1 volume C 412 is stored on storage devices 116e and 116f. RAID 10 volume D 416 is stored on storage devices 116g, 116h, 116i, 116j, 116k, and 116l. RAID 1 volume E 420 is stored on storage devices 116m and 116n.

Each of the five RAID 1 and RAID 10 volumes are part of a RAID 1+1 volume or a RAID 10+1 volume. A secondary storage device 116o provides storage for the $3^{rd}$ redundant copy of data for each RAID 1+1 or 10+1 volume. Therefore, volume A includes RAID 1 volume 404 and RAID 1+1 volume 424, volume B includes RAID 1 volume 408 and RAID 1+1 volume 428, volume C includes RAID 1 volume 412 and RAID 1+1 volume 432, volume D includes RAID 10 volume 416 and RAID 10+1 volume 436, and volume E includes RAID 1 volume 420 and RAID 1+1 volume 440.

Depending on the physical storage capacity of secondary storage device 116o, a $3^{rd}$ redundant copy of data for many RAID 1 or 10 volumes may be stored on the same physical storage device 116. This allows a single secondary storage device 116o to provide additional redundant storage for potentially many RAID 1 or RAID 10 arrays, which aggregates cost and makes RAID 1+1 or 10+1 storage even more cost effective.

A first array of storage devices 116 includes RAID 1 volume A 404 and a secondary storage device, RAID 1+1/RAID 10+1 storage device 116o. A second array of storage devices 116 includes RAID 1 volume B 408 and the secondary storage device, RAID 1+1/RAID 10+1 storage device 116o. A third array of storage devices 116 includes RAID 1 volume C 412 and the secondary storage device, RAID 1+1/RAID 10+1 storage device 116o. A fourth array of storage devices 116 includes RAID 10 volume D 416 and the secondary storage device, RAID 1+1/RAID 10+1 storage device 116o. A fifth array of storage devices 116 includes RAID 1 volume E 420 and the secondary storage device, RAID 1+1/RAID 10+1 storage device 116o. RAID 1 volume A 404, RAID 1 volume B 408, RAID 1 volume C 412, RAID 10 volume D 416, and RAID 1 volume E 420 are each mirrored sets of primary storage devices 116. The secondary storage device 116o has at least the capacity to store the data stored on all of the mirrored sets of primary storage devices 404, 408, 412, 416, and 420.

Referring now to FIG. 5, a block diagram illustrating data striping on primary 504 and secondary 508 storage devices in accordance with the preferred embodiment of the present invention is shown. Data striping is a process of arranging data on storage devices 116 in equal-size stripes. Striping improves sequential read and write performance, especially to multiple storage devices 116 accessed in parallel.

FIG. 5 illustrates a single RAID 1+1 array, which includes two primary storage devices 504 and a single secondary storage device 508. Primary storage devices 504 includes primary storage device 504a and 504b. Each of these primary storage devices 504, 508 is striped with 8 equal-sized stripes, identified as stripe 0 through stripe 7. RAID 1+1 requires data to be stored on three storage devices 116: both primary storage devices 504a and 504b, and a secondary storage device 508.

In a preferred embodiment shown in FIG. 5, the stripe data is distributed among the three storage devices 504a, 504b, and 508 such that each storage device stores the same actual data in a different stripe. For example, data A 512 is stored in stripe 0 of primary storage device 504a, data A 525 is stored in stripe 1 of primary storage device 504b, and data A 538 is stored in stripe 2 of secondary storage device 508. This means that any data will be stored in a physically different location on each storage device 116 of a RAID 1+1 array or a RAID 10+1 array. If storage devices 116 are disk drives or sequential access storage devices 116 including tape drives, data access will take a different amount of time for each storage device 116. Therefore, it is possible to determine which of the available storage devices 116 (storage devices 504a, 504b, and 508 in this case) will be the fastest to access the data, based on where the specific data is stored on each storage device 116. This allows reads to be directed to the storage device 116 that can supply data the fastest, thereby improving performance.

In the preferred embodiment, the primary storage devices 504 have one or more higher performance attributes than the secondary storage device 508. Higher performance characteristics includes at least one of data read latency, data write latency, read data transfer rate, and write data transfer rate. It is desirable to have a difference in I/O performance between primary and secondary storage devices in order to achieve dual storage redundancy at a low price premium compared to conventional storage redundancy. For example, in disk drive storage devices 116, fast serial attached SCSI (SAS) storage devices 116 can be used for primary storage devices 504, while larger in capacity and less expensive Serial ATA (SATA) or older generation SAS storage devices 116 can be used for secondary storage devices 508.

Although the embodiment illustrated in FIG. 5 shows 8 stripes in each storage device 504a, 504b, and 508, it should be understood that the technique described herein is applicable to practically any number of stripes and stripe arrangement. Additionally, the secondary storage device 508 is typically significantly larger than the primary storage devices 508, and allows for more stripes than the primary storage devices 504. A common number of stripes were shown for each storage device 504a, 504b, and 508 in order to facilitate clarity and ease of understanding.

Referring now to FIG. 6a, a block diagram illustrating a first embodiment RAID 10+1 array chunk distribution in accordance with the present invention is shown. A RAID 10+1 volume 604 includes multiple RAID 1 volumes, identified as RAID 1 volume A 608, RAID 1 volume B 620, and RAID 1 volume C 632.

Each RAID 1 volume 608, 620, and 632 includes two storage devices 116. RAID 1 volume A 608 includes disk 0 612 and disk 1 616, RAID 1 volume B 620 includes disk 2 624 and disk 3 628, and RAID 1 volume C 632 includes disk 4 636 and disk 5 640. Each disk is striped, with the same stripe size used for all disks of the RAID 1 volumes 608, 620, and 632. The portion of a stripe on a single disk is referred to as a chunk. Although 6 stripes or chunks are illustrated on each disk 612, 616, 624, 628, 636, and 640, it should be understood that any number of stripes or chunks may be actually present.

RAID 10+1 volume 604 also includes a seventh disk, identified as disk 6 644, which is a secondary storage device 508. All of the other disks 612, 616, 624, 628, 636, and 640 are primary storage devices 504. Disk 6 644 is also striped as the other disks of RAID 10+1 volume 604, and stores a $3^{rd}$ copy ($2^{nd}$ redundant copy) of data stored on the primary storage devices 504.

All chunks with the same chunk number store the same data. Therefore, the data corresponding to chunk 0 is stored in the first stripe of disk 0 612, the first stripe of disk 1 616, and the first stripe of disk 6 644. The data corresponding to chunk 1 is stored in the first stripe of disk 2 624, the first stripe of disk 3 628, and the second stripe of disk 6 644. Every other chunk is distributed in a similar fashion between three disks. Although the chunks are alternated between primary storage devices 504, the chunks are still arranged on disk 6 644 according to RAID 1 volume order.

Arranging RAID 10+1 chunks in the order illustrated in FIG. 6a has certain performance advantages. In this embodiment, data reads generally utilize the primary storage devices 504, which are generally higher performance storage devices 116 than the secondary storage device 644. Because chunks are striped across primary storage device 504 pairs, long reads gain the performance benefit of striping. Long writes also stripe and the secondary storage device 644 performs long writes as sequential writes. Read operations are only directed to the secondary storage device 644 in a near 100% read environment. Reads to the secondary storage device 644 also perform well if there are a small number of large reads (sent to the secondary storage device 644) mixed with many short reads (send to the pairs of primary storage devices 504).

The embodiment of FIG. 6a also provides performance and simplified implementation benefits when the primary storage devices 504 are Solid State Disks (SSDs). SSD data rates do not vary the way rotating disks do, so there's no reason for complicated mapping. Mapping all data linearly on the secondary storage device 644 provides benefits because sequential operations remain sequential—which simplifies the storage controller 108, 308 implementation even if it doesn't make a difference in SSD performance.

Referring now to FIG. 6b, a block diagram illustrating a second embodiment RAID 10+1 array chunk distribution in accordance with the present invention is shown. A RAID 10+1 volume 604 includes multiple RAID 1 volumes, identified as RAID 1 volume A 608, RAID 1 volume B 620, and RAID 1 volume C 632.

The second embodiment of FIG. 6b is similar to the first embodiment of FIG. 6a, with the exception that the second primary storage device 616, 628, 640 of each RAID 1 volume 608, 620, 632, respectively, swaps the two halves of the first primary storage device 612, 624, 636. For example, disk 0 612 includes in sequence chunks 0, 3, 6, 9, 12, and 15, and disk 1 616 swaps in sequence the lower and upper half chunks of disk 0 612.

For predominantly read I/O requests, each primary storage device 504 that is a disk drive storage device 116 should prefer the block range which maps closest to the start of the primary storage device 504 (since those blocks have larger cylinders). Again, the secondary storage device disk 6 644 is normally not used for reads, so it simply maps the data chunks sequentially. This makes implementation simpler and has the same advantage as the embodiment illustrated in FIG. 6a for sequential reads directed to the secondary storage device 616.

Referring now to FIG. 6c, a block diagram illustrating a third embodiment RAID 10+1 array chunk distribution in accordance with the present invention is shown. A RAID 10+1 volume 604 includes multiple RAID 1 volumes, identified as RAID 1 volume A 608, RAID 1 volume B 620, and RAID 1 volume C 632.

The third embodiment maps the first and second thirds of the primary storage device 504 pairs to the start of the paired primary storage device 504. It maps the last third of the data to the secondary storage device 644. This embodiment gives performance benefits for disk drive storage devices 116 if the secondary storage device 644 performance is close to that of the primary storage devices 504 since it allows each third of the data to be mapped onto the outer cylinders of some primary storage device 504. This embodiment has performance advantages if all (or almost all) I/O is smaller than the chunk size, so that the RAID 10 striping is not used to improve performance.

Referring now to FIG. 7a, a flowchart illustrating a data read operation in accordance with a first embodiment of the present invention is shown. Flow begins at block 704.

At block 704, the storage controller 108, 308 receives a host read request 324 from a host computer 104, 304. Flow proceeds to block 708.

At block 708, the storage controller 108, 308 converts the host read request 324 into one or more RAID read requests. Flow proceeds to block 712.

At block 712, the storage controller 108, 308 sends the one or more RAID read requests to a selected primary RAID 1 or RAID 10 storage device 504. A primary storage device 504 is a storage device 116 that is part of a normal RAID 1 or RAID 10 array. In the preferred embodiment, the selected primary RAID 1 or RAID 10 storage device 504 is the RAID 1 or RAID 10 storage device 116 that can supply the data with the least amount of latency. In one embodiment, the least amount of latency corresponds to a storage device 116 that is not currently busy, compared to a storage device 116 that is currently busy. In another embodiment, the least amount of latency corresponds to a storage device 116 where the read data is stored on a more outside track compared to the other storage device 116 of a mirrored pair—where both storage devices 116 are disk drives. Flow proceeds to block 716.

At block 716, the storage controller 108, 308 receives read data 340 from the selected primary RAID 1 or RAID 10 storage device 504. Flow proceeds to block 720.

At block 720, the storage controller 108, 308 provides read data 340 and a command completion to the requesting host computer 104, 304. The command completion closes out the host read request 324 of block 704. Flow ends at block 720.

Referring now to FIG. 7b, a flowchart illustrating a data write operation in accordance with a first embodiment of the present invention is shown. Flow begins at block 750.

At block 750, the storage controller 108, 308 receives a host write request 324 from a host computer 104, 304. Flow proceeds to block 754.

At block 754, the storage controller 108, 308 prepares cache 316 space for write data and informs the host computer 104, 304 it is ready to receive write data. The storage controller 108, 308 determines the contents of data cache 316 and allocates space in the data cache 316. Flow proceeds to block 758.

At block 758, the storage controller 108, 308 receives write data from the host computer 104, 304. Flow proceeds to block 762.

At block 762, the storage controller 108, 308 converts the host write request 324 into one or more RAID write requests. Flow proceeds to block 766.

At block 766, the storage controller 108, 308 stores the write data 336 in the controller data cache 316. Flow proceeds to block 770.

At block 770, the storage controller 108, 308 provides a command completion to the requesting host computer 104, 304. The command completion closes out the host write request 324 of block 750, although the storage controller 108, 308 must still store the write data 336 in the data cache 316 to the storage devices 116.

At block 774, the storage controller 108, 308 sends the write data 336 in the data cache 316 to selected primary RAID 1 or RAID 10 storage devices 504 and the secondary storage device 508. Flow ends at block 774.

Referring now to FIG. 8a, a flowchart illustrating a data read operation in accordance with a second embodiment of the present invention is shown. Flow begins at block 804.

At block 804, the storage controller 108, 308 receives a host read request 324 from a host computer 104, 304. Flow proceeds to block 808.

At block 808, the storage controller 108, 308 converts the host read request 324 into one or more RAID read requests. Flow proceeds to decision block 812.

At decision block 812, the storage controller 108, 308 determines if a primary storage device 504 is available. If a primary storage device 504 is available, then flow proceeds to block 816. If a primary storage device 504 is not available, then flow proceeds to block 824.

At block 816, the storage controller 108, 308 sends one or more RAID read requests to a selected primary RAID 1 or RAID 10 storage device 504. Flow proceeds to block 820.

At block 820, the storage controller 108, 308 receives read data 340 from the selected primary RAID 1 or RAID 10 storage device 504. Flow proceeds to block 832.

At block 824, the storage controller 108, 308 sends one or more read requests to the secondary RAID 1 or RAID 10 storage device 508. Flow proceeds to block 828.

At block 828, the storage controller 108, 308 receives read data 340 from the secondary RAID 1 or RAID 10 storage device 508. Flow proceeds to block 832.

At block 832, the storage controller 108, 308 provides read data 340 and a command completion to the requesting host computer 104, 304. The command completion closes out the host read request 324 of block 804. Flow ends at block 832.

Referring now to FIG. 8b, a flowchart illustrating a data write operation in accordance with a second embodiment of the present invention is shown. Flow begins at block 850.

At block 850, the storage controller 108, 308 receives a host write request 324 from a host computer 104, 304. Flow proceeds to block 854.

At block 854, the storage controller 108, 308 prepares cache 316 space for write data and informs the host computer 104, 304 it is ready to receive write data. The storage controller 108, 308 determines the contents of data cache 316 and allocates space in the data cache 316. Flow proceeds to block 858.

At block 858, the storage controller 108, 308 receives write data from the host computer 104, 304. Flow proceeds to block 862.

At block 862, the storage controller 108, 308 converts the host write request 324 into one or more RAID write requests. Flow proceeds to block 866.

At block 866, the storage controller 108, 308 stores the write data 336a in the controller first cache 316a and write data 336b in the controller second cache 316b. Write data 336a is the same as write data 336b, and is stored in two separate cache locations 316a, 316b to improve write performance. In the preferred embodiment, the second cache 316b is a space normally used to store parity information and is a parity cache. This space is available if only non-parity arrays are currently controlled by the storage controller 108, 308. Flow proceeds to block 870.

At block 870, the storage controller 108, 308 provides a command completion to the requesting host computer 104, 304. The command completion closes out the host write request 324 of block 850, although the storage controller 108, 308 must still store the write data 336a, 336b in the first cache 316a and second cache 316b, respectively. Flow proceeds to block 874.

At block 874, the storage controller 108, 308 sends the write data 336a in the first cache 316a to selected primary RAID 1 or RAID 10 storage devices 504. This frees up the first cache 316a to store additional write data 336a corresponding to other host write requests 324. Flow proceeds to block 878.

At block 878, the storage controller 108, 308 sends the write data 336b in the second cache 316b to the secondary storage device 508. Because secondary storage device 508 is often slower than primary storage devices 504, staging the data in this way allows the secondary storage device 508 to complete the write operation at a later time than the primary storage devices 504. This frees up the first cache 316a to store additional write data 336a corresponding to other host write requests 324 while the write to the secondary storage device 508 is occurring. In the preferred embodiment, the storage controller 108, 308 sends write data in the second cache 316b to the secondary storage device 508 after the storage controller 108, 308 sends write data in the first cache 316a to the primary storage devices 504. Flow ends at block 878.

Referring now to FIG. 9, a flowchart illustrating a data read operation involving a secondary storage device 508 in accordance with a second embodiment of the present invention is shown. Flow begins at block 904.

At block 904, the storage controller 108, 308 receives a host read request 324 from a host computer 104, 304. Flow proceeds to block 908.

At block 908, the storage controller 108, 308 converts the host read request 324 into one or more RAID read requests. Flow proceeds to decision block 912.

At decision block 912, the storage controller 108, 308 determines if a preferred primary storage device 504 is available. A preferred primary storage device 504 is the primary storage device 504 in an array of storage devices that would be expected to provide the best data read performance at the current time. For example, if a given storage device 116a of a two storage device RAID 1 array 328 is currently busy and the other storage device 116b in the same RAID 1 array 328 is not busy, the other storage device 116b would be the preferred primary storage device 504. As another example, consider a two storage device RAID 1 array 328 where both storage devices 116a and 116b are currently not busy and the storage devices 116a, 116b are hard disk drives. In that case, the preferred primary storage device 504 will be the storage device 116a, 116b of the RAID 1 array 328 that stores the requested data on an outer track compared to the other storage device 116 of the same RAID 1 array 328. If a preferred primary storage device 504 is available, then flow proceeds to block 916. If a preferred primary storage device 504 is not available, then flow proceeds to block 920.

At block 916, the storage controller 108, 308 sends one or more RAID read requests to the preferred primary storage device 504. Flow proceeds to block 928.

At block 920, the storage controller 108, 308 sends one or more RAID read requests to the non-preferred primary storage device 504 in the same mirrored set as the preferred primary storage device 504. Flow proceeds to decision block 924.

At decision block 924, the storage controller 108, 308 determines if unrecoverable read errors are being detected while reading data from the non-preferred primary storage device 504. Unrecoverable read errors are errors returned by storage devices 116 when reading one or more blocks. If unrecoverable read errors are detected, then flow proceeds to block 932. If unrecoverable read errors are not detected, then flow proceeds to block 928.

At block 928, the storage controller 108, 308 receives read data 340 from the preferred (if from block 916) or non-preferred (if from decision block 924) primary storage device 504. In either case, the data read operation has been successful. Flow proceeds to block 940.

At block 932, the storage controller 108, 308 sends one or more RAID read requests to the secondary storage device 508. Although it is not preferred to use the secondary storage device 508 for data read operations since the secondary storage device 508 may be significantly slower than primary storage devices 504, problems with accessing the read data from both of the primary storage devices 504 has required directing the RAID read request to the secondary storage device 508. Flow proceeds to block 936.

At block 936, the storage controller 108, 308 receives read data 340 from the secondary storage device 508. Flow proceeds to block 940.

At block 940, the storage controller 108, 308 provides read data 340 and a command completion to the requesting host computer 104, 304. The command completion closes out the host read request 324 of block 904. Flow ends at block 940.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A plurality of arrays of storage devices, comprising:
a plurality of mirrored sets of primary storage devices comprising at least one RAID 10 array, the plurality of mirrored sets of primary storage devices each a different volume from the other mirrored sets of primary storage devices, storing a first and a second copy of data and comprising an even number of at least two or more physical primary storage devices; and
a secondary single physical storage device storing a third copy of the data stored on each of the plurality of mirrored sets of primary storage devices and comprising stripes interleaved in a rotating order from each pair of primary storage devices of the at least one RAID 10 array, the secondary single physical storage device having at least the capacity to store the data stored on the plurality of mirrored sets of primary storage devices.

2. The plurality of arrays of storage devices of claim 1, wherein the primary storage devices have higher performance characteristics than the secondary storage device, wherein higher performance characteristics comprises at least one of data read latency, data write latency, read data transfer rate, and write data transfer rate.

3. The plurality of arrays of storage devices of claim 1, wherein each mirrored set of the plurality of mirrored sets of primary storage devices and the secondary storage device are striped, wherein a copy of data stored in a given stripe of any one of a primary and secondary storage device is stored in a different stripe of a different physical storage device in the same array of storage devices, wherein the plurality of arrays of storage devices provides dual storage device redundancy, wherein dual storage device redundancy preserves data if data cannot be read from one or two physical storage devices in any array of the plurality of arrays of storage devices.

4. The plurality of arrays of storage devices of claim 2, wherein a storage controller coupled to the plurality of arrays of storage devices controls the primary and secondary storage devices, the storage controller comprising:
a processor;
a memory, coupled to the processor, the memory comprising:
a first cache; and
a second cache.

5. The plurality of arrays of storage devices of claim 4, wherein each mirrored set of the plurality of mirrored sets of primary storage devices comprises one of a RAID 1 array and a RAID 10 array, wherein in response to host read requests, the storage controller provides host read request data from a mirrored set of the plurality of mirrored sets of primary storage devices and not the secondary storage device.

6. The plurality of arrays of storage devices of claim 5, wherein the storage controller stores RAID write data in the first cache and the second cache, wherein the storage controller writes RAID write data in the first cache to primary storage devices, wherein the storage controller writes RAID write data in the second cache to the secondary storage device.

7. The plurality of arrays of storage devices of claim 6, wherein the storage controller writes RAID write data in the second cache to the secondary storage device after writing RAID write data in the first cache to the primary storage devices.

8. The plurality of arrays of storage devices of claim 7, wherein after detecting a failure of a first primary storage device in a first mirrored set of primary storage devices, the storage controller detects a number of unrecoverable read errors from a second primary storage device in the first mirrored set of primary storage devices, wherein in response the storage controller reads the data corresponding to the unrecoverable read errors from the secondary storage device.

9. A storage controller, comprising:
a first cache storing data corresponding to a plurality of mirrored sets of primary storage devices comprising at least one RAID 10 array and read from a primary storage device location that will supply data faster than a mirror location of the primary storage device, the plurality of mirrored sets of primary storage devices each storing a first and a second copy of data and comprising an even number of a plurality of primary storage devices; and
a second cache storing data corresponding to a secondary storage device storing third copies of data stored on each of the plurality of mirrored sets of primary storage devices, the secondary storage device comprising stripes interleaved in a rotating order from each of a pair of primary storage devices of the at least one RAID 10 array and having at least the capacity to store data stored on a plurality of different volumes corresponding to the plurality of mirrored sets of primary storage devices.

10. The storage controller of claim 9, wherein each of the primary storage devices and the secondary storage device are physical storage devices, wherein the primary storage devices have higher performance characteristics than the secondary storage device, wherein higher performance characteristics comprises at least one of data read latency, data write latency, read data transfer rate, and write data transfer rate.

11. The storage controller of claim 10, wherein the plurality of mirrored sets of primary storage devices and the secondary storage device are striped, wherein data stored in a given stripe of any one of a primary and secondary storage device is stored in a different stripe of a different storage device in the array, wherein an array comprises each of the plurality of mirrored sets of primary storage devices and the secondary storage device, wherein the storage controller provides dual storage device redundancy wherein dual storage device redundancy preserves data if one or two storage devices in the array fail.

12. The storage controller of claim 11, wherein the storage controller writes RAID write data in the second cache to the secondary storage device after the storage controller writes RAID write data in the first cache to the primary storage devices.

13. The storage controller of claim 12, wherein after detecting a failure of a first primary storage device in a first mirrored set of primary storage devices, the storage controller detects a number of unrecoverable read errors from a second primary storage device in the first mirrored set of primary storage devices, wherein in response the storage controller reads the data corresponding to the unrecoverable read errors from the secondary storage device.

14. The storage controller of claim 12, wherein all data stored on the plurality of mirrored sets of primary storage devices is further stored on the secondary storage device.

15. The storage controller of claim 14, wherein each of the plurality of mirrored sets of primary storage devices is one of a RAID 1 array and a RAID 10 array.

16. A storage system, comprising:
   a storage controller that fills space in a first cache corresponding to first RAID write data with second RAID write data while the storage controller writes the first RAID write data in a second cache to a secondary storage device, the storage controller comprising:
      the first cache storing RAID write data and writing first RAID write data to a mirrored set of primary storage devices; and
      the second cache storing RAID write data and writing first RAID write data to the secondary storage device after writing the first RAID write data in the first cache to the mirrored set of primary storage devices; and
   an array, comprising:
      the mirrored set of primary storage devices; and
      the secondary storage device having lower performance characteristics and a higher storage capacity than the mirrored set of primary storage devices.

17. The storage system of claim 16, wherein the mirrored set of primary storage devices and the secondary storage device are striped, wherein data stored in a given stripe of any one of a primary and secondary storage device is stored in a different stripe of a different storage device in the array, wherein lower performance characteristics comprises any of data read latency, data write latency, read data transfer rate, and write data transfer rate.

18. The storage system of claim 17, wherein after detecting a failure of a first primary storage device in a first mirrored set of primary storage devices, the storage controller detects a number of unrecoverable read errors from a second primary storage device in the first mirrored set of primary storage devices, wherein in response the storage controller reads the data corresponding to the unrecoverable read errors from the secondary storage device, wherein dual storage device redundancy preserves data if one or two storage devices in the array fail.

* * * * *